June 28, 1949.  F. K. STEIN  2,474,500

HIGH-LOW SPEED ATTACHMENT FOR DRILL PRESSES

Filed Jan. 7, 1948  2 Sheets-Sheet 1

INVENTOR.
Frederick K. Stein,
BY Victor J. Evans & Co.
ATTORNEYS

June 28, 1949.  F. K. STEIN  2,474,500
HIGH-LOW SPEED ATTACHMENT FOR DRILL PRESSES
Filed Jan. 7, 1948  2 Sheets-Sheet 2
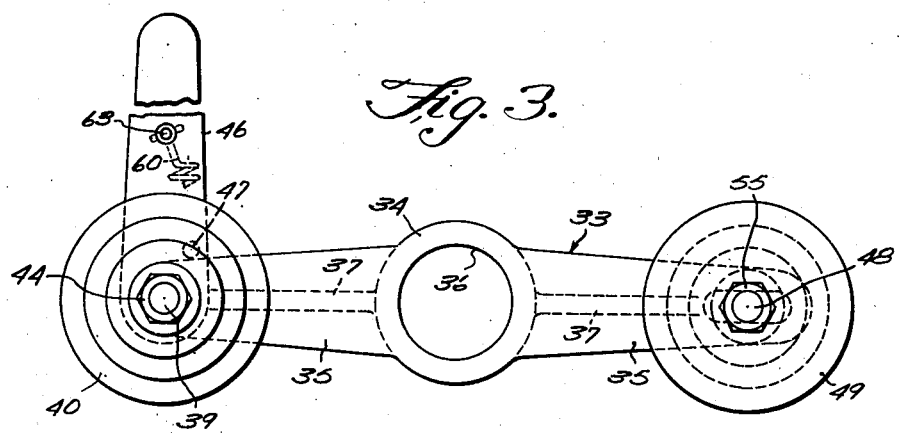
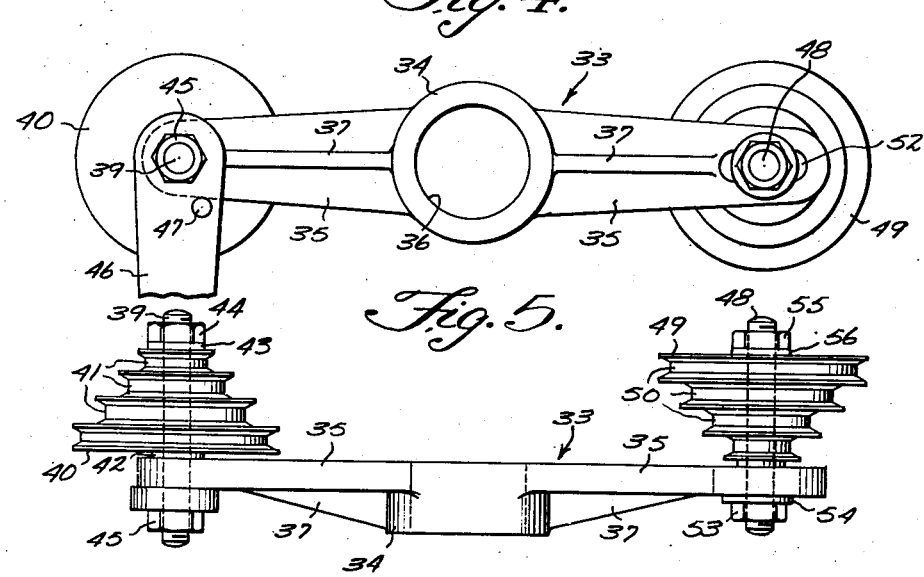
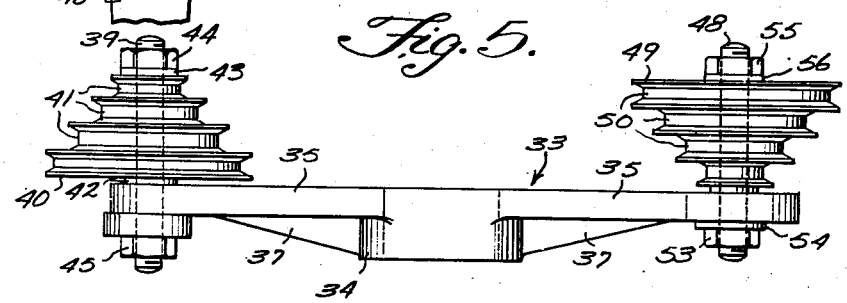
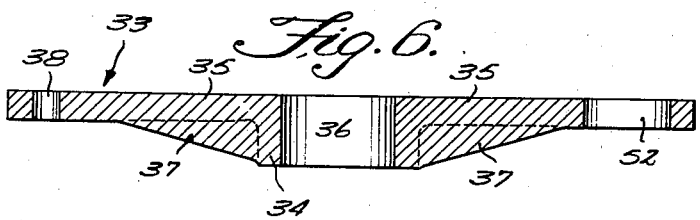
INVENTOR.
Frederick K. Stein,
BY Victor J. Evans & Co.
ATTORNEYS Patented June 28, 1949

2,474,500

UNITED STATES PATENT OFFICE 2,474,500

HIGH-LOW SPEED ATTACHMENT FOR DRILL PRESSES

Frederick Kenneth Stein, Rockford, Ill.

Application January 7, 1948, Serial No. 1,023

5 Claims. (Cl. 74—242.11)

The present invention relates to a high and low speed power transmission attachment for drill presses and other machine tools, and more particularly to a power transmission of the belt and pulley type.

The primary object of the invention is to provide a belt and pulley power transmission for drill presses and other machine tools which will enable the operator to shift the transmission belts in a quick and easy manner.

Another object of the invention is to provide a high and low speed power transmission attachment for drill presses and other machine tools which can be easily installed on drill presses of conventional design and construction without materially altering the structure and the arrangement of the drive and driven pulleys forming a part of said drill press.

Another object of the invention is to provide a high and low speed power transmission attachment for drill presses and other machine tools which can be easily and quickly installed or removed so that the machine tool can be quickly and easily converted with ease and facility.

Another object of the invention is to provide a high and low speed power transmission attachment for drill presses and other machine tools which will permit the use of a large number of drills or other cutting tools of various diameters by reason of the wide range of different cutting speeds available.

Another object of the invention is to provide a high and low speed power transmission attachment for drill presses and other machine tools which is adapted to be removably received on the column of a conventional drill press or similar machine tool by sliding the attachment in position thereover without disturbing the remaining parts of the drill press or machine tool.

Another object of the invention is to provide a high and low speed power transmission unit for drill presses and other machine tools which is capable of being used with the shiftable drill press or machine tool head in any of its positions of vertical adjustment. Since the unit is slidably mounted on the drill press column or support, it will follow the various adjustments so that the drive belts will remain in the same horizontal plane.

Other objects and advantages of the invention will become apparent during the course of the following description of the accompanying drawings wherein:

Figure 3 is a top elevational view of the high and low speed power transmission unit detached from the drill press to illustrate various details of construction.

Figure 4 is a bottom view of the high and low speed power transmission unit showing the manner in which the control lever is rockably mounted on one of the pulley bearing supports.

Figure 1:
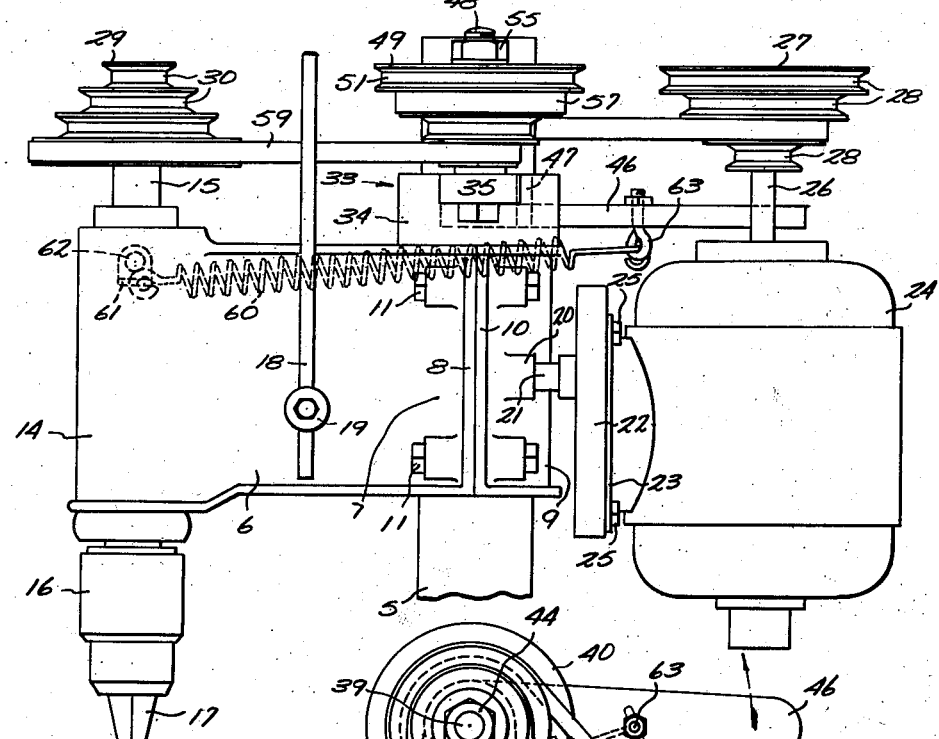
Figure 1 is a fragmentary side elevational view of the upper portion of a drill press including the drill press head showing the manner in which the high and low speed power transmission unit is assembled thereon.

Figure 5 is a side elevational view of the high and low speed power transmission attachment removed from the drill press to show the arrangement of the stepped transmission pulleys, and Figure 6 is a longitudinal cross sectional view of the high and low speed power transmission attachment showing the general shape in longitudinal section and illustrating the longitudinal slot in one end thereof to facilitate adjustment of one of the transmission pulleys.

In the drawings, wherein for the purpose of illustrating the invention and wherein like reference characters will be employed to designate like parts throughout the same, the reference character 5 will generally be employed to represent the column of a conventional drill press or other machine tool of a similar character, the upper portion being shown for the purpose of illustration while the lower portion (not shown) is supported on a bench by means of a suitable stand.

Adjustably mounted on the upper end of the column 5 is a drill press head 6 which generally comprises a casting shaped to provide a semi-cylindrical portion 7 flanged as at 8 to receive and cooperate with a semi-cylindrical casting 9 likewise flanged as at 10. The flanges 8 and 10 are adapted to be bolted together by means of bolts or machine screws 11 to clamp the semi-cylindrical castings 7 and 9 in tight engagement with the supporting column or post 5.

The drill press head also includes a cylindrical portion 14 having bearings in the upper and lower portions thereof for supporting a drill spindle 15 on the lower end of which is positioned a quill 16 and a drill chuck 17. An operating handle 18 is affixed to a control shaft 19 having a rack and gear connection (not shown) to move the quill 16 toward and away from the work.

Formed on the semi-cylindrical casting 9 is a pair of spaced apart projections or bosses 20 having studs 21 for supporting a plate 22 to which the base 23 of an electric motor 24 is securely attached by suitable screws 25. The armature shaft 26 of the motor is provided with a stepped or cone drive pulley 27 having a plurality of pulley grooves 28 of different diameters. Similarly, the drill spindle 15 is provided with a stepped or cone pulley 29 arranged in an inverted position with its pulley grooves 30 located opposite the pulley grooves 28. In drill presses and other machine tools of the above described type, an endless transmission belt is passed over the pulleys 27 and 29 to drivingly connect the motor 24 to the drill spindle 15, and by arranging the transmission belt in correspondingly positioned grooves 28 and 30 of the respective pulleys 27 and 29, four drive speeds may be attained.

The invention comprises a high and low speed power transmission attachment consisting of a cross arm casting 33 having a central enlarged hub portion 34 and integrated radially extending arms 35. The hub portion 34 is provided with an opening 36 of a diameter equal to the diameter of the drill press post or column 5, so that said casting can be assembled on said column with a snug sliding fit to permit easy angular adjustment or movement thereof about the axis of column or post 5. Reinforcing ribs 37 are formed on the underside of said casting and said ribs extend from the hub portion 34 to a point adjacent the ends of said arms 35.

One of said arms 35 is provided with an opening 38 for receiving a pulley supporting spindle 39, upon which is rotatably mounted a stepped cone pulley 40 having a plurality of pulley grooves 41 of different diameters. Suitable bearing washers 42 and 43 are disposed between the arm 35 and stepped cone pulley 40 as well as the upper portion of the pulley, and a retaining nut 44 to allow free rotation of said pulley under driving conditions. A retaining nut 45 is threaded on the lower end of the pulley spindle 39, and said retaining nut is adapted to provide a support for a contact lever 46 to hold the same in position on the lower end of said pulley spindle 39 for a purpose which will be hereinafter more fully described. A stop pin 47 is anchored in an opening in said control lever and is positioned to engage the arm 35 and limit angular displacement of said lever.

Mounted on the other arm 35 of the casting 33 is a pulley spindle 48 for rotatably supporting a similar stepped cone pulley 49, having its stepped pulley grooves 50 arranged in reverse order to the pulley grooves 41 of the pulley 40. The opposite ends of the pulley spindle 48 are threaded, and one end of said spindle is passed through an elongated slot 52 in the arm 35, and has threaded thereon a nut 53. A washer 54 is interposed between the arm and nut, and the washer is of a diameter to bridge the slot 52 and securely hold the spindle in position. The opposite threaded end of the spindle 48 is provided with a retaining nut 55 and a washer 56 is interposed between the nut 55 and pulley bearing, to thereby hold the pulley in position for free rotation, and to prevent axial displacement of the pulley.

The pulleys 40 and 49 are adapted to be drivingly connected by means of an endless transmission belt 57, which is received in correspondingly positioned grooves 41 and 50 of the respective pulleys 40 and 49.

Similarly, endless transmission belts 58 and 59 are provided for drivingly connecting the pulley 27 to the pulley 40, and the pulley 49 to the drill spindle pulley 29. It will thus be seen, that the endless transmission belts 58 and 59 may be trained over the pulleys 27—40 and 49—29 in such a manner as to produce a wide range of different driving or cutting speeds to adapt the drill press or machine tool to a great number of drills of different diameters.

Figure 2:
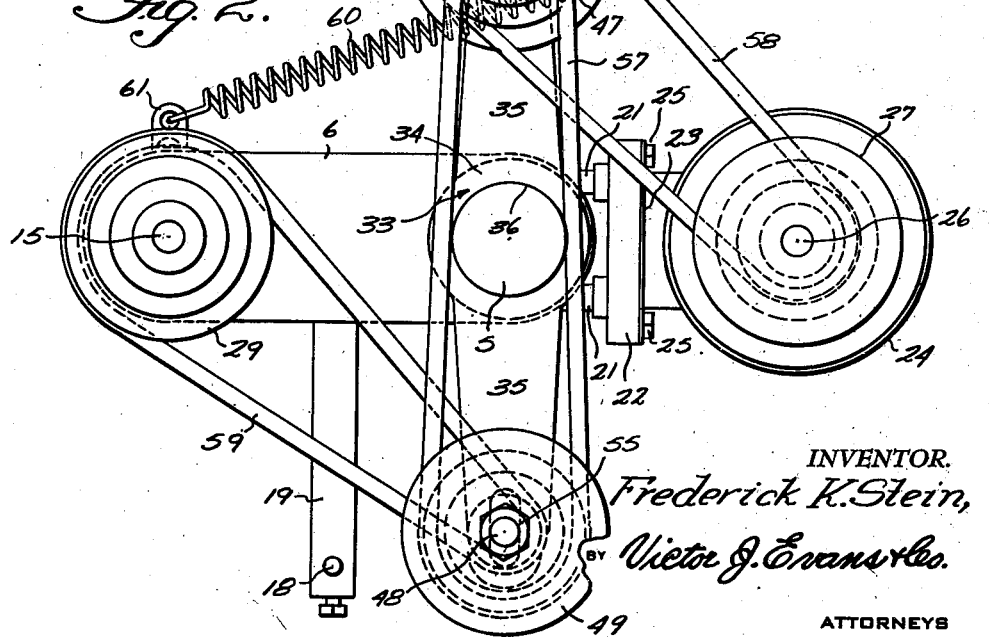
Figure 2 is a top elevational view showing the manner in which the high and low speed power attachment is installed and the location of the various drive belts.

A coil spring 60 has one of its ends attached to a clip 61, fastened to the cylindrical portion 14 of the drill press head by means of a screw 62. The opposite end of the coil spring 60 is affixed to a screw eye 63, mounted in the control lever 46 and positioned intermediate the ends thereof. When the control lever 46 is positioned as shown in Figure 2, the casting 33 is yieldingly urged in a counter-clockwise direction to oppose the pull of the endless transmission belts 58 and 59, so that said belts will be maintained in driving relationship with corresponding stepped pulley grooves. When the control lever 46 is turned in a counter-clockwise direction from the position shown in Figure 2, to a position in which the screw eye 63 and coil spring 60 passes over the center of the pulley spindle 39, the yielding spring action will be released so that the endless transmission belts 58 and 59 can be easily repositioned with respect to their reversely related stepped pulley grooves for changing the drive speed of the drill spindle 15.

When it is desired to change the position of the drill press head 6, on the column or support 5, the machine screws 11 are loosened to permit sliding movement of the head on the column. As this occurs the high and low speed attachment 33 will follow the adjustment of the head so that the hub 34 of the casting will be supported on the upper end of the semi-cylindrical portions 7 and 9 of the split casting sections.

It will thus be understood, that by releasing the yielding spring action by manipulating the control lever 46 as above described, the transmission belts 58 and 59 can be arranged with respect to their coplanar grooves so that the drill spindle 15 may be driven at relatively low speeds or, the belts may be shifted to produce a relatively high drill spindle speed. Thus, the required cutting speed of the drill spindle can be obtained for a large number of drills of different diameters for work pieces of ferrous and non-ferrous metals. Since the operator may obtain the correct cutting speed by shifting the belts as above described, the drill press can be operated so as not to injure the drill but yet maintain maximum production.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

I claim:

1. In a drill press having a tool spindle and a drive motor supported by a vertical column, an arm supported by said column; stepped cone pulleys mounted on each end of said arm with the stepped grooves thereof arranged in reverse relation; a transmission belt interchangeably positioned around said pulleys, an interchangeable transmission belt drivingly connecting the motor to one of said pulleys and an interchangeable transmission belt drivingly connecting the other of said pulleys with the tool spindle.

2. In a drill press having a tool spindle and a drive motor supported by a vertical column, an arm rockably mounted on said column to swing horizontally, stepped cone pulleys mounted on each end of said arm with the stepped grooves thereof in reverse relation, a transmission belt interchangeably connecting said pulleys, an interchangeable transmission belt drivingly connecting the motor shaft with one of said pulleys, an interchangeable transmission belt drivingly connecting the other of said pulleys with the tool spindle and yielding spring means for urging said arm in a direction to maintain the transmission belts in contactual engagement with their respective pulleys.

3. In a drill press having a tool head supported on a vertical column for mounting a drive motor and a tool spindle, a cross arm mounted on said column for free swinging and sliding movement, stepped cone pulleys rotatably supported on each end of said cross arm with their stepped grooves reversely arranged, stepped cone pulleys mounted on the armature shaft of said drive motor and tool spindle likewise having their stepped grooves reversely arranged, a transmission belt interchangeably and drivingly connecting the stepped cone pulleys on the cross arm, a transmission belt drivingly and interchangeably connecting the stepped pulley on the drive motor with one of the stepped pulleys on the cross arm, a transmission belt drivingly and interchangeably connecting the other of said stepped pulleys on the cross arm with the stepped pulley on the drive spindle, and a spring connecting said cross arm to yieldingly urge said arm in a direction to maintain the transmission belts in tight driving engagement with their respective stepped cone pulleys.

4. In a drill press having a tool head supported on a vertical column and mounting a drive motor and a tool spindle, a cross arm mounted on said column for free swinging and sliding movement, stepped pulleys rotatably supported on each end of said cross arm with their stepped grooves reversely arranged, a stepped cone pulley mounted on the armature shaft of said drive motor, a stepped cone pulley mounted on the tool spindle, said last named stepped pulleys being arranged with their stepped grooves in reverse order, an endless transmission belt drivingly connecting the stepped pulleys on the cross arm and adapted to be interchangeably engaged with a pair of aligned pulley grooves thereof, an endless transmission belt drivingly connecting the stepped cone pulley of the drive motor with one of the stepped cone pulleys on the cross arm, a transmission belt drivingly connecting the other of said stepped cone pulleys on the cross arm with the stepped cone pulley on the tool spindle, a coil spring having one end affixed to the drill press head and its opposite end affixed to the cross arm to urge the transmission belts in tight engagement with their respective pulleys and means for releasing the spring tension of said coil spring to allow interchanging of said transmission belts and the positioning thereof in the various grooves of the stepped pulleys.

5. In a drill press having a tool head supported on a vertical column for mounting a drive motor and tool spindle thereon, a cross arm mounted on said column to swing and slide freely thereon, stepped cone pulleys mounted on the ends of said arm and arranged with their grooves in reversely stepped order, a transmission belt drivingly connecting said pulleys and adapted to be interchanged with the various pulley grooves thereof, a stepped cone pulley on the drive motor and tool spindle with their stepped pulley grooves likewise arranged in reverse order, a transmission belt drivingly connecting the stepped cone pulley on the drive motor with the stepped cone pulley on the cross arm which has its stepped pulley grooves in reversely arranged order with respect to the grooves on the drive motor, a transmission belt drivingly connecting the other of said stepped cone pulleys carried by said cross arm with the stepped cone pulley on the tool spindle, a lever pivotally mounted on one of the ends of said cross arm, a coil spring having one of its ends attached to the drill press head, and its opposite end to said lever and a stop pin mounted on said lever engageable with the cross arm to limit swinging movement thereof and maintain a yielding spring action on the cross arm in a counter-clockwise direction, said lever being adapted to be shifted to release the tension of the coil spring and permit interchanging of the transmission belts connecting the drive motor and the tool spindle.

FREDERICK KENNETH STEIN.

No references cited.